United States Patent [19]
Adar et al.

[11] Patent Number: 5,699,457
[45] Date of Patent: Dec. 16, 1997

[54] IMAGE COMPRESSION CODER HAVING IMPROVED BIT RATE CONTROL AND BLOCK ALLOCATION

[75] Inventors: Rutie Adar, Jerusalem; Michael Gransky, Haifa; Rafael Retter, Haifa; Aharon Gill, Haifa, all of Israel; Isaac Shenberg, Palo Alto, Calif.

[73] Assignee: Zoran Corporation, Santa Clara, Calif.

[21] Appl. No.: 88,096

[22] Filed: Jul. 2, 1993

Related U.S. Application Data

[63] Continuation of Ser. No. 852,479, Mar. 17, 1992, abandoned.

[51] Int. Cl.$^6$ ........................................... G06T 9/00
[52] U.S. Cl. ........................................... 382/239; 382/250
[58] Field of Search ........................... 382/56, 239, 250, 382/248, 232; 358/433, 432

[56] References Cited

U.S. PATENT DOCUMENTS

| | | |
|---|---|---|
| 5,051,840 | 9/1991 | Watanabe et al. ............ 358/432 |
| 5,063,608 | 11/1991 | Siegel .............................. 382/239 |

OTHER PUBLICATIONS

Mitchell, Joan L. "Evolving JPEG Color Data Compression Standards," Abstract, *Standards for Electronic Imaging Systems*, Critical Reviews vol. CR37 pp.68–93.

Shenberg, Isaac, et al. "An Image Compression Chip Set for Digital Still Cameras and Peripherals," *Electronic Imaging International '91*, Hynes Convention Center, Boston, MA, Sep. 30–Oct. 3, 1991.

*Primary Examiner*—Yon J. Couso
*Assistant Examiner*—Jon Chang
*Attorney, Agent, or Firm*—Townsend and Townsend and Crew LLP; Henry K. Woodward

[57] ABSTRACT

A method of bit rate control and block allocation for discrete cosine transform (DCT) image signal compression includes the steps of (a) partitioning the image signals in blocks representing portions of the total image, (b) calculating DCT coefficients for image data in all blocks, (c) obtaining a measure of block activity (BACT) for each block based on DCT coefficients and for the total image activity (ACT) as a sum of the measures of all block activity, and (d) determining a code allocation factor (AF) for each block based on the ratio of block activity (BACT) to target code volume (TCV data) for the coded image data. Thereafter, step (e) includes allocating bits for each block using the allocation factor (AF) for each block and the target code volume (DCV data). Steps (a–d) are carried out with a first statistical pass through the image data, and step (e) is carried out in a second compression pass through the image data using the code allocation factor (AF) from step (d) and an estimation of unpredictable features for each block. Step (e) further includes comparing the estimation of unpredictable features to the accumulated actual code volume and adding extra bits to the allocation for at least the next block allocation and subtracting borrowed bits from at least the next block allocation.

13 Claims, 5 Drawing Sheets

IMAGE COMPRESSION CODER HAVING IMPROVED BIT RATE CONTROL AND BLOCK ALLOCATION

This is a Continuation of application Ser. No. 07/852,479, filed Mar. 17, 1992, now abandoned.

BACKGROUND OF THE INVENTION

This invention relates generally to image compression, and more particularly the invention relates to discrete cosine transform (DCT) based compression and coding of images.

Image compression is used in reducing large volumes of data in digitized images for convenient and economical storage and for transmission across communication networks having limited bandwidth. Image compression technology is important in digital still video cameras, color scanners, color printers, color fax machines, computers, and multimedia.

The joint photographic experts group (JPEG) has established a color image data compression standard for use in a variety of still image applications. Compression employs DCT-based processes operating on discrete blocks of the image. The DCT coefficients are then quantized based on measurements of the threshold for visibility. For coding, an 8×8 pixel array of DCT coefficients is reorganized into a one dimensional list using a zigzag sequence which tends to concentrate coefficients expressing the lowest spatial frequencies at lower indices with the DC component being number 0 in the zigzag. The quantized AC coefficients are then encoded using a Huffman coder. Finally, headers and markers are inserted in the codes for individual blocks along with bit and byte stuffings for JPEG data compatibility. FIG. 1 illustrates the JPEG compression algorithm.

The compressed data can then be stored (as in an electronic still camera) or transmitted efficiently over a limited bandwidth communication network. Reconstruction of the image requires a reverse process in which the headers and markers are extracted, the Huffman code is decoded, coefficients are dequantized, and an inverse DCT (IDCT) operation is performed on the coefficients.

Zoran Corporation (assignee herein) has developed a chip set for image compression including a discrete cosine transform (DCT) processor designated ZR36020 and an image compression coder/decoder designated ZR36031, as shown in FIG. 2. The chip set employs an algorithm or high quality compression of continuous tone color or monochrome images similar to the JPEG standard. The DCT processor implements both forward and inverse discrete cosine transform computations on 8×8 pixel blocks, while the coder/decoder implements the quantization, dequantization, Huffman encoding and decoding of the image compression algorithm. The chip set reduces the large data size required to store and transmit digital images by removing statistical redundancies in the image data while maintaining the ability to reconstruct a high quality image. For example, in digital still video cameras, the chip set enables the use of 1M byte solid state memory card instead of a 24M byte hard disk to store two 768×480 pixel images. The chip set also reduces the time required to transmit a 768×480 pixel image over a standard 9600 bits per second telephone line from 15 minutes to 40 seconds. The chip set has been optimized for use in digital still video cameras, color video printers, fixed bit rate image transmission devices, security systems, and call sensitive image compression systems.

Bit rate control (BRC) is utilized in compressing the image into the predetermined file size. To execute the bit rate control algorithm, the coder performs two-pass compression including a statistical pass (Pass 1) throughout the image prior to the actual compression pass (Pass 2). The activity of the image and of every block are computed during the statistical first pass through the image. A scale factor for the quantization mechanism is computed according to the image activity, and the code volume of each image block is limited based on the activity of that block. Remainder bits are transferred to the allocation for the next block to improve the target compressed image size utilization.

The quantization of the coefficients is done by using quantization tables. The compression ratio is controlled by scaling the quantization tables with a uniform scale factor. A large scale factor results in a high compression ratio and vice versa. The mechanism to determine the scale factor is by using the two passes: the first pass through the image is done with an initial scale factor (ISF). The quantization tables are scaled with the initial scale factor. Code volume needed for encoding the quantized DCT coefficients is accumulated during this pass using the Huffman tables (ACV data). This code volume is then used as the activity measure of the image. A new scale factor (NSF) is calculated from the TCV data and ACV data and from the initial scale factor by:

$$NSF = \frac{SF}{\left(\frac{TCV\,DATA}{ACV\,DATA}\right)^{1.5}}$$

The new scale factor (NSF) is then used for the second pass in which the actual encoding is done.

The total code volume is controlled by limiting the code volume of each block. Each block is allocated a code volume (ABCV) with the block allocation depending on an allocation factor (AF) and on an activity measure of that block in the last pass.

For example, the allocation factor can be computed at the ratio between the target code volume (TCV) and the code volume which was accumulated in the statistical pass (ACV). The activity of each block is then measured by its code volume in the statistical pass (BCV) as follows:

$$ACV = \sum_{blocks} BCV$$

$$AF = \frac{TCV\,data}{ACT\,data}$$

The allocated code volume for each block is the product of the block code volume in the statistical pass and the allocation factor (AF×BCV).

Encoding the quantized DC coefficient of a block guarantees minimal information about the block in the reconstructed image. Thus, the DC coefficient is encoded even if there is not enough bits allocated to the block. The bits for encoding the DC coefficients are borrowed from the next block allocation. After encoding the DC of the block, the code volume of the quantized AC coefficients is inspected. When the code volume for the next AC coefficient exceeds ABCV, the encoding of the quantized AC coefficient of that block is truncated, i.e. the rest of the coefficients are given the value 0. As noted above, for the purpose of encoding the AC coefficients are arranged in the zigzag order.

The block allocation depends on some activity measurement of the block which is measured after quantizing the DCT coefficients and calculating the code size for encoding them using the Huffman tables. This calculation is done after processing the block using the current scale factor. The scale factor is adjusted to fit the image characteristics before the second pass. Therefore, it is necessary to store in the statistical pass the code volume of each block or to fully encode each block twice during the compression pass, once for calculating its activity using the initial scale factor and once for performing the encoding, using the adjusted scale factor. However this is inefficient in storage and in performance.

The activity measured and gathered in the first pass are used for allocating bits to the blocks in the second pass. The relative activity of each block is a forecast of its relative code volume in the second pass. If the compressed data consists only of encoded image data and of a possible overhead of known length, the existing bit rate control behaves well. However, a problem arises when the compressed data includes additional features for which the code volume cannot be forecast. In such cases, the computations of the block code volumes and the accumulated code volume from the first pass cannot be used to forecast with precision the code volumes of the second pass. The JPEG algorithm exemplifies this problem. There are three items in the compressed data for which the code volume cannot be forecast: the bit and byte stuffings and the end of block (EOB) codes which may or may not appear.

The remainder after the block encoding is added to the allocation of the next block. This can cause an unbalanced distribution of the remainder bits among the image blocks. A borrow of bits for encoding the DC coefficient can cause an early truncation of the AC coefficients of the next block.

SUMMARY OF THE INVENTION

The present invention is directed to improving image compression coding in determining block activity and allocating block bits including the distribution of positive and negative remainders for a block allocation.

More particularly, according to a preferred embodiment in the preliminary statistical pass (pass 1), block activity is calculated from the DCT coefficients before quantization. The activity measure of each block is the same in the statistical pass and in the compression pass. Calculating the activity in the DCT domain without performing any quantization saves the need to store the activity in each block or process each block twice in the compression pass, which saves computation time and memory space.

For example, in computing block activity, BACT, in the DCT domain, the sum of the coefficients absolute values, the same sum without the DC value, the root of the sum of squared coefficients, or the variants in the DCT domain can be employed. Further, different weights for different frequencies can be used in the summation to improve the activity calculation. Alternatively, the block activity can be calculated in the image domain as the variance of the pixel values in the block.

In the allocation of bits, a separation is made between the code volume of the encoded image data and other coded features. In the statistical pass the target code volume and the accumulated code volume refer only to the coded image data (TCV data and ACV data). TCV data is computed from the target compressed image size by subtracting the overhead and an estimation of the code volume of the unpredictable features. Thus, new scale factor (NSF) and allocated block code volume (ABCV) are computed only from the encoded image data code volume. In the compression pass the code volume of the unpredictable features is accumulated and an estimation thereof is calculated. After the encoding of each block, the calculated estimation is compared to the accumulated actual code volume. If the estimation were too large, the extra bits are added to the allocation for the compressed image data to improve compression quality. On the other hand, if the estimation were too small, the difference is taken from the allocation for the next block or blocks. The adjustment is done dynamically using the block bit allocation mechanism.

Any remainder (REM) is spread between the allocation for the next several blocks instead of the next single block. This minimizes the possible unbalanced distribution of allocated bits as the allocation of each block depends less on the encoding of the previous block. The number of affected blocks can be determined by the user from a given set.

The invention and objects and features thereof will be more readily apparent from the following detailed description and appended claims when taken with the drawing.

DESCRIPTION OF SPECIFIC EMBODIMENTS

Figure 1:
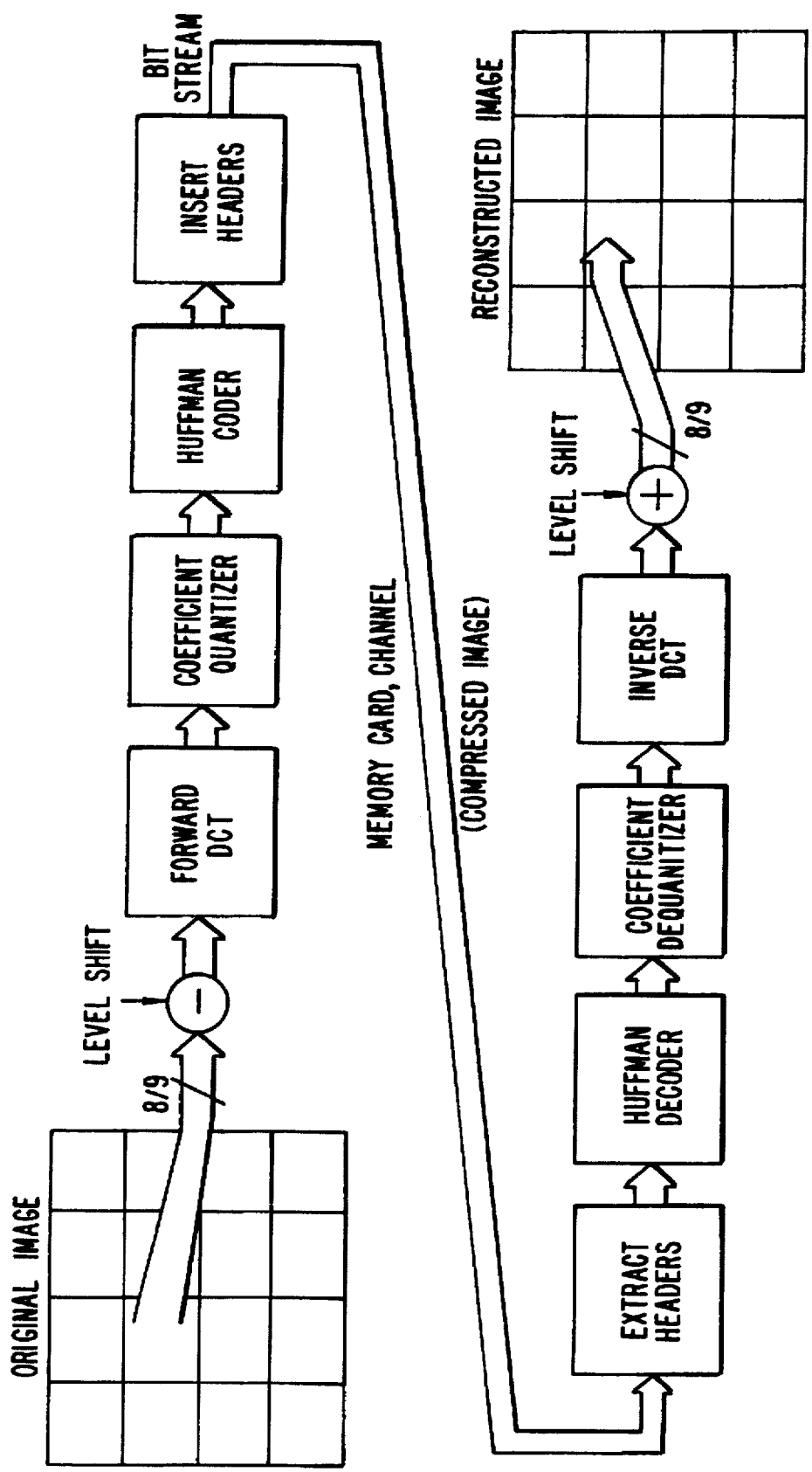
FIG. 1 is a functional block diagram illustrating a compression/decompression algorithm.
Figure 2:
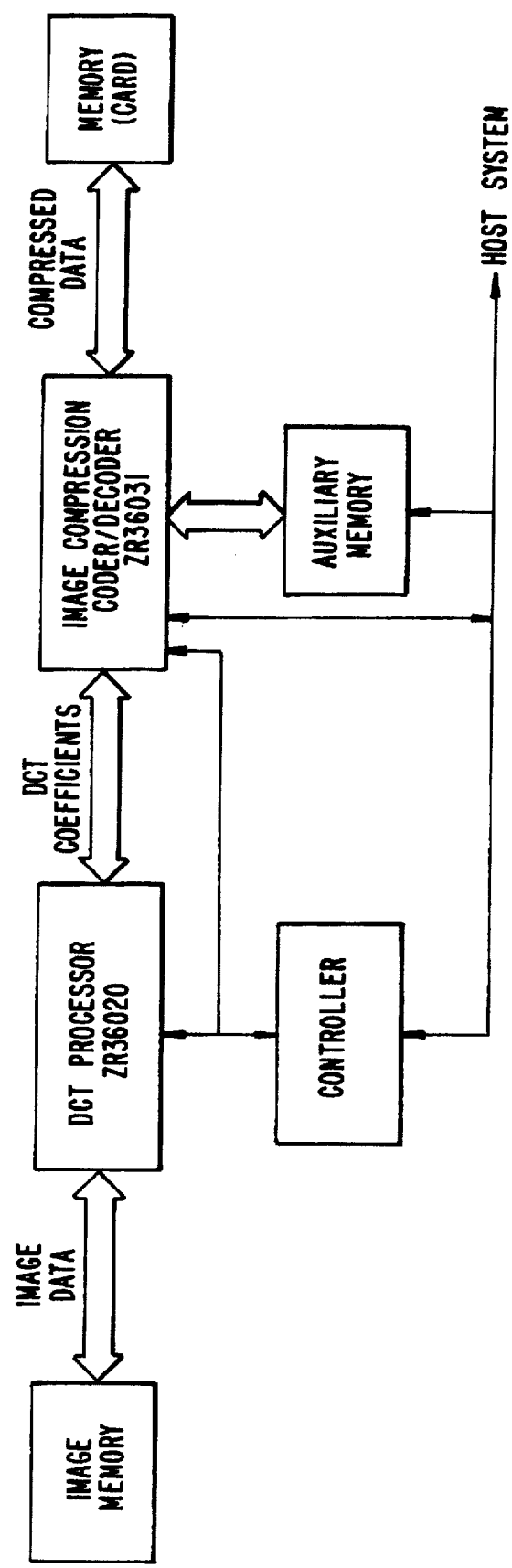
FIG. 2 is a functional block diagram of apparatus for implementing the algorithm of FIG. 1.
Figure 3:
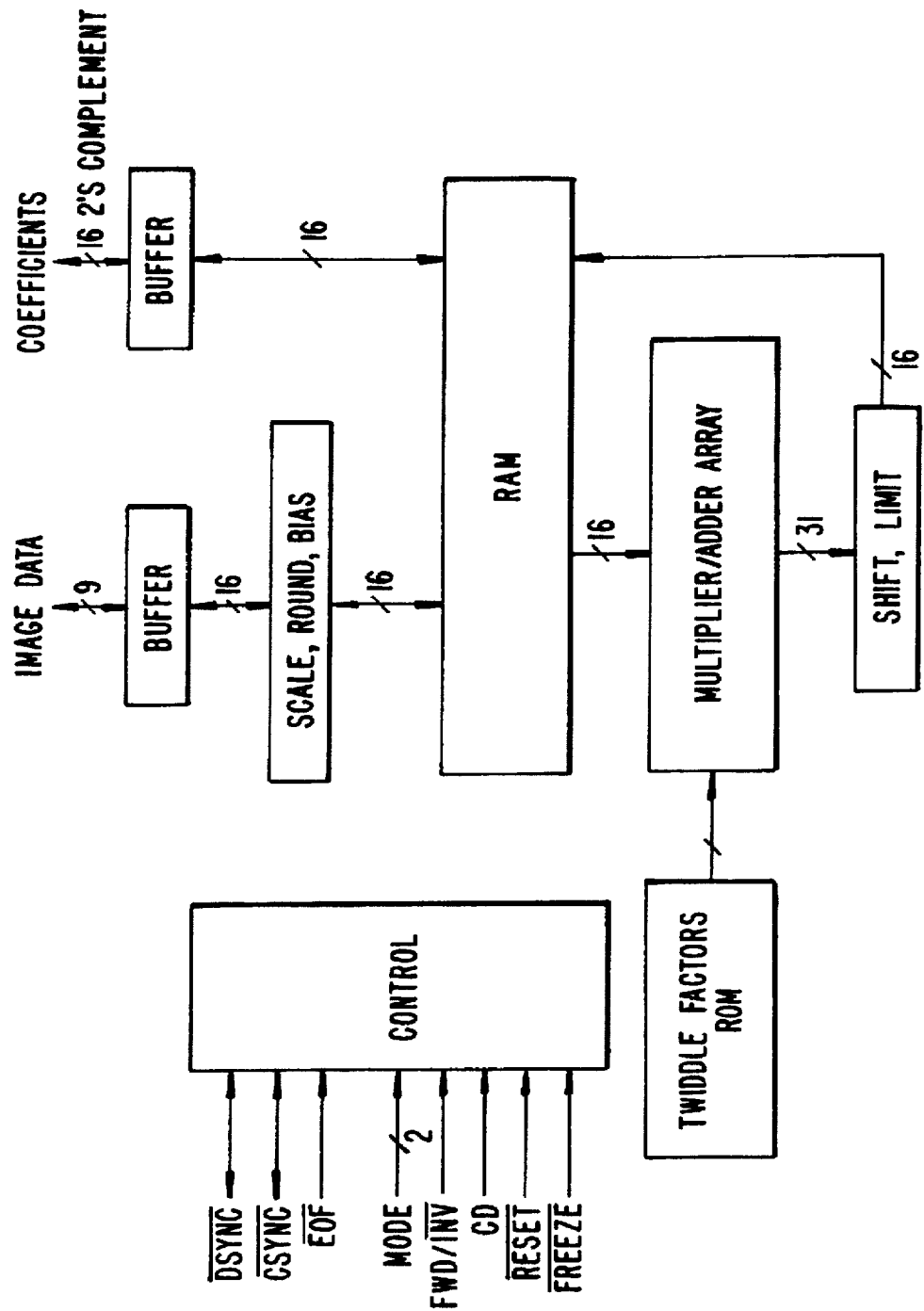
FIG. 3 is a functional block diagram of the Zoran ZR36020 DCT processor.
Figure 4:
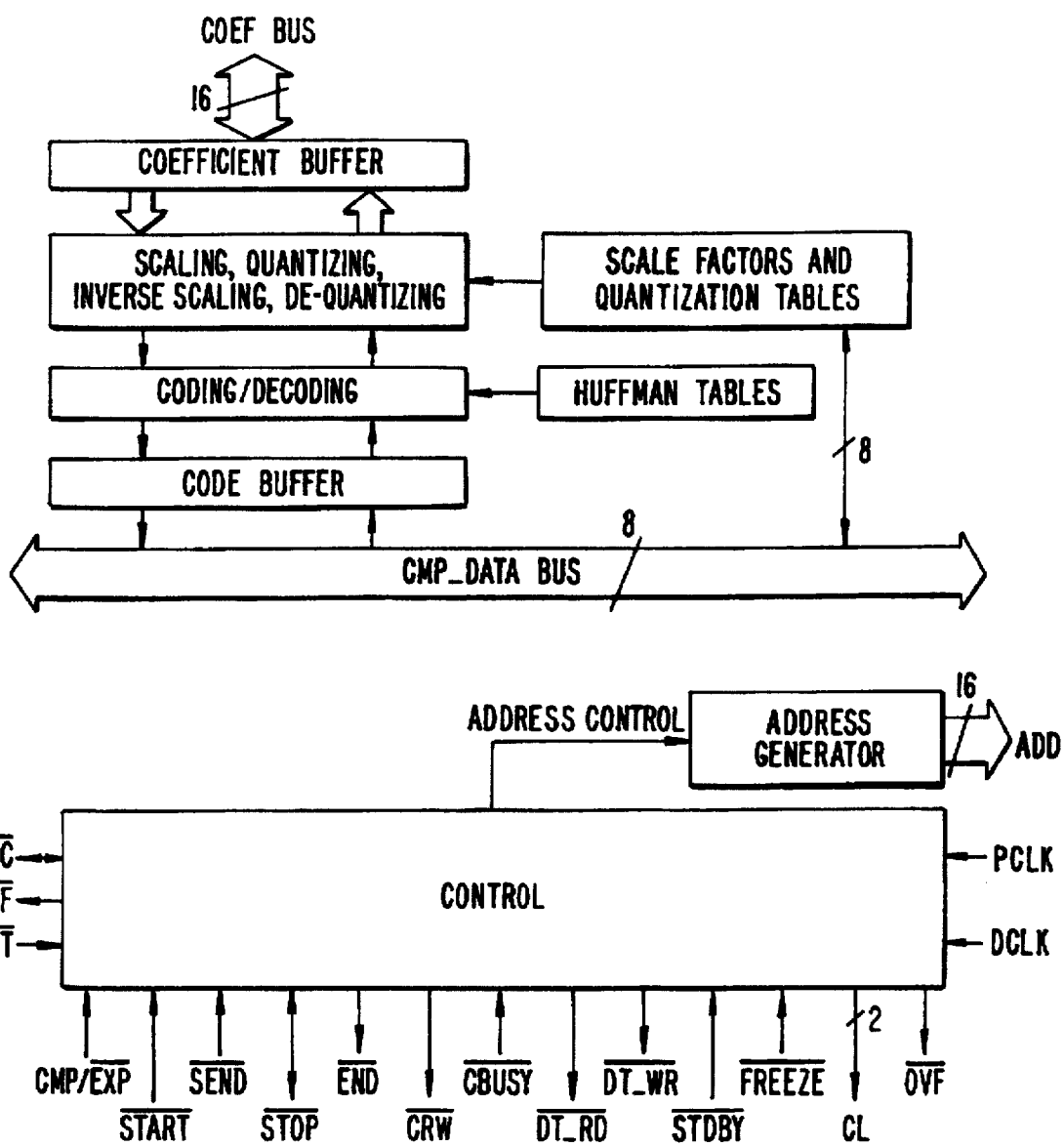
FIG. 4 is a functional block diagram of the Zoran ZR36031 image compression coder/decoder in which the present invention can be implemented.

As described above, FIG. 1 is a functional block diagram of the DCT/IDCT compression algorithm, and FIG. 2 is a functional block diagram of the Zoran image compression chip set including the ZR36020 DCT processor and the ZR36031 coder/decoder. FIG. 3 and FIG. 4 are functional block diagrams of the ZR36020 DOT processor and of the ZR36031 coder/decoder, respectively.

One embodiment of the invention will be described using a JPEG example using the DCT processor and the coder/decoder of FIGS. 3 and 4. Problems and limitations of the conventional implementation will be noted, and then the improvements according to the present invention will be described.

The following notations are used in the description:

TargetSize—The total target compressed image size given by the user. In the JPEG example the TargetSize includes:

Marker codes and fields of signaling parameters.

Byte-stuffings.

Bit-stuffings.

Codes for EOB's (End of Block)

Coded image data (e.g. Huffman codes and additional bits).

TCV data—The target code volume for the coded image data only.

TCVnet—The TargetSize without the a-priori known header size. In the JPEG example, it includes the target code volume for the coded image data, the EOB's and the bit and byte stuffings. That is, TCV excluding the marker-codes and their signaling fields.

OVERHEAD—The volume of the a-priori known header. In the JPEG example this number refers to the marker codes and their signaling field. TCVnet is computed from TargetSize by subtracting this OVERHEAD.

ACVdata—The accumulated code volume of the coded image data alone.

ACVnet—The accumulated code volume of the coded image data and the volume of the net known a-priori overhead. This overhead refers to the code which is added to the image data code, and its volume cannot be determined a-priori.

SF—A scale factor for the quantization tables, given by the user.

NSF—A new scale factor, which is calculated after performing a statistical pass through the image.

AF—An allocation factor, used for calculating ABCV.

ASV—The accumulated overhead, which is not determined a-priori. In the JPEG example it refers to the bit and byte stuffings.

ACT—The total activity of the image, as computed from the DCT coefficients magnitudes.

BACT—The block activity measured from the block DCT coefficients magnitudes.

ABCV—The allocated block code volume for image data only.

BCV—The accumulated code volume of the image coded data of a single block.

REM—A signed number which is a part of allocated bits for the block, based on the borrows and the remainders of the previous blocks.

FIG. 3 is a functional block diagram of the ZR36020 DCT processor which is described in detail in the Zoran specification sheet dated September 1991, incorporated by reference herein.

The ZR36020 operates as a dedicated processor; the host system controls the transform direction and data format by setting the control lines. Once initialized, the device will operate continuously at data rates up to 15 Mbytes/sec. Data entered in row-major format is output in column-major format, while data entered in column-major format is output in row-major format.

The device executes the known forward discrete cosine transform (FDCT) on data and generates DCT coefficients for the data. The device also executes the known inverse discrete cosine transform (IDCT).

FIG. 4 is a functional block diagram of the Zoran ZR36031 coder/decoder which is described in more detail in the Zoran specification sheet dated November 1991, which is incorporated herein by reference.

The ZR36031 Image Compression Coder/Decoder is a high-speed image processor that receives coefficients and performs scaling, quantization and variable-length encoding for image compression (coding), as well as the corresponding inverse operations for expansion (decoding).

In a coding operation, the ZR36031 accepts 16-bit DCT coefficients from the DCT chip. The coefficient data is scaled, quantized, coded and stored in memory or transmitted over a communication channel. In the decoding operation, the compressed data is decoded, dequantized and rescaled in the ZR36031. The resulting coefficient values are sent to the DCT where a 2-D Inverse Discrete Cosine Transform is performed, providing a close match to the original image.

The ZR36020 DCT processor converts image data into its spatial frequency components. The high-frequency components contain the fine detail of the image, while the low-frequency components contain the coarse features. As a result, the higher-frequency components are generally less sensitive to human vision, and can be quantized more coarsely or discarded with negligible effect on the image quality.

Once transformed with a DCT processor, the image data (coefficients) are quantized using a "quantization table," which indicates the degree of quantization for each coefficient of the DCT; higher-frequency coefficients are quantized more coarsely.

The quantized image data contains long strings of zeros, due to the fact that the higher-frequency coefficients typically have small values. To efficiently store the image data, the ZR36031 uses zigzag modified run-length coding. With this method, the data is characterized in terms of its non-zero values and the number of zeros between adjacent non-zero values. As a result, a long string of zeros is coded as a single number. Huffman coding is then used, whereby bit patterns of different lengths code the non-zero data values; values that occur frequently use the shortest codes, while those that seldom occur use the longest codes. These techniques greatly reduce the amount of memory needed to store an image.

In addition to regular compression, the user can preset the required size of the compressed file. The size of the compressed file is data-dependent for a given set of quantization tables. Moreover, images with fine detail will generate considerably larger compressed files than smooth images. This feature is crucial in applications where the storage space allocated for an image is fixed.

To achieve this goal, the ZR36031 performs a statistical pass (Pass 1) throughout the image prior to the compression pass (Pass 2). In Pass 1, the ZR36031 computes the activity of each block, as well as the entire image, and the global information is used to rescale the quantization tables. In Pass 2, the ZR36031 computes the Allocated Block Code Volume for each block based on the block activity. If the actual code length of the block being encoded is less than the Allocated Block Code Volume, then the unused bits will be carried over to the next block. If the code length of the block exceeds the Allocated Block Code Volume, then the code of this block will be truncated. This forces the "missing" bits to be distributed over the entire image, rather than consistently truncating the last blocks of the image.

The existing DCT/IDCT processing has several problems in implementation relating to activity measurement, allocation of bits for the image, and distribution of any remainder.

The block allocation depends on some activity measurement of the block. In the ZR36031 solution this activity is measured after quantizing the DCT coefficients and calculating the code size for encoding them using the Huffman tables. This calculation is done after processing the block using the current scale factor. The scale factor is adjusted to fit the image characteristics before the second pass. Therefore, it is necessary to store in the statistical pass the code volume of each block or to fully encode each block twice during the compression pass, once for calculating its activity using the initial scale factor and once for performing the encoding, using the adjusted scale factor. This is inefficient in storage or in performance. Further, the activity of each block and of the entire image is computed in the image domain. The computation is done in sub-blocks, by calculating the average of each sub-block and the sum of differences from the average of each pixel. This special computation is complex.

In the allocation of image bits, the activity measure gathered in the first pass are used for allocating bits to the blocks in the second pass. The relative activity of each block is a forecast to its relative code volume in the second pass. If the compressed data consists only of encoded image data and of a possible overhead of a known length, the existing bit rate control behaves well. The problem arises when the compressed data consists of additional features, for which the code volume cannot be forecast. In such cases, the computations of the block code volumes and the accumulated code volume from the first pass cannot be used to forecast, precisely enough, the code volumes of the second pass. The JPEG algorithm is an example for the allocation problem. There are three items in the compressed data for which the code volume cannot be forecast: The bit and byte stuffings and the end-of-block (EOB) codes which may or may not appear.

Finally, the remainder after the block encoding is added to the allocation of the next block only. This may cause an unbalanced distribution of the remainder bits among the image blocks. A borrow of bits for encoding the DC coefficient may cause an early truncation of the AC coefficients of the next block.

The present invention overcomes these problems with a new measurement of activity, a new allocation of bits and a new distribution of remainder. The measurement of activity can be used in any DCT-based compression while the allocation of bits and distribution of remainder can be extended to any system with variable overhead such as JPEG. Block bit allocation is computed in a new and more efficient way, and block allocation is controlled according to the difference between the estimated code volume of the unpredictable features and their actual code volume. Block allocation is improved by spreading the unused and borrowed bits between several blocks rather than a single following block.

A preferred embodiment of the invention performs two types of passes through the image. The first type is a statistical pass and is used for computing the image activity. No code is output during this pass. The second type is a compression pass, where the activity information of each block and of the entire image is used to allocate and control the size of the output compressed output.

In the measurement of activity, the activity is calculated from the DCT coefficients before quantization. This calculation is done without the need for code length computation. The activity measure of each block is the same in the statistical pass and in the compression pass. Calculating the activity in the DCT domain without performing any quantization, saves the need to store the activity of each block, or process each block twice in the compression pass. This saves memory or computations.

For example, in computing BACT in the DCT domain, the sum of the coefficients absolute values, the same sum without the DC value, the root of the sum of squared coefficients, or the variance in the DCT domain can be used. Different weights for different frequencies can be used in the summation to improve the activity calculation. Other possible activity measures, which are calculated before fully encoding the blocks may be used as well. The block activity can be calculated in the image domain as the variance of the pixel values in the block. The activity of the image (ACT) is computed as the sum of the blocks activity (BACT) and is used to compute the allocation factor.

In the allocation of bits, a separation is done between the code volume of the encoded image data and other coded features. In the statistical pass the target code volume and the accumulated code volume will refer only to the coded image data (TCV data and the ACV data). TCV data is computed from the target compressed image size by subtracting the OVERHEAD and an estimation of the code volume of the unpredictable features. Thus, NSF and ABCV are computed only from the encoded image data code volume.

Figure 5:
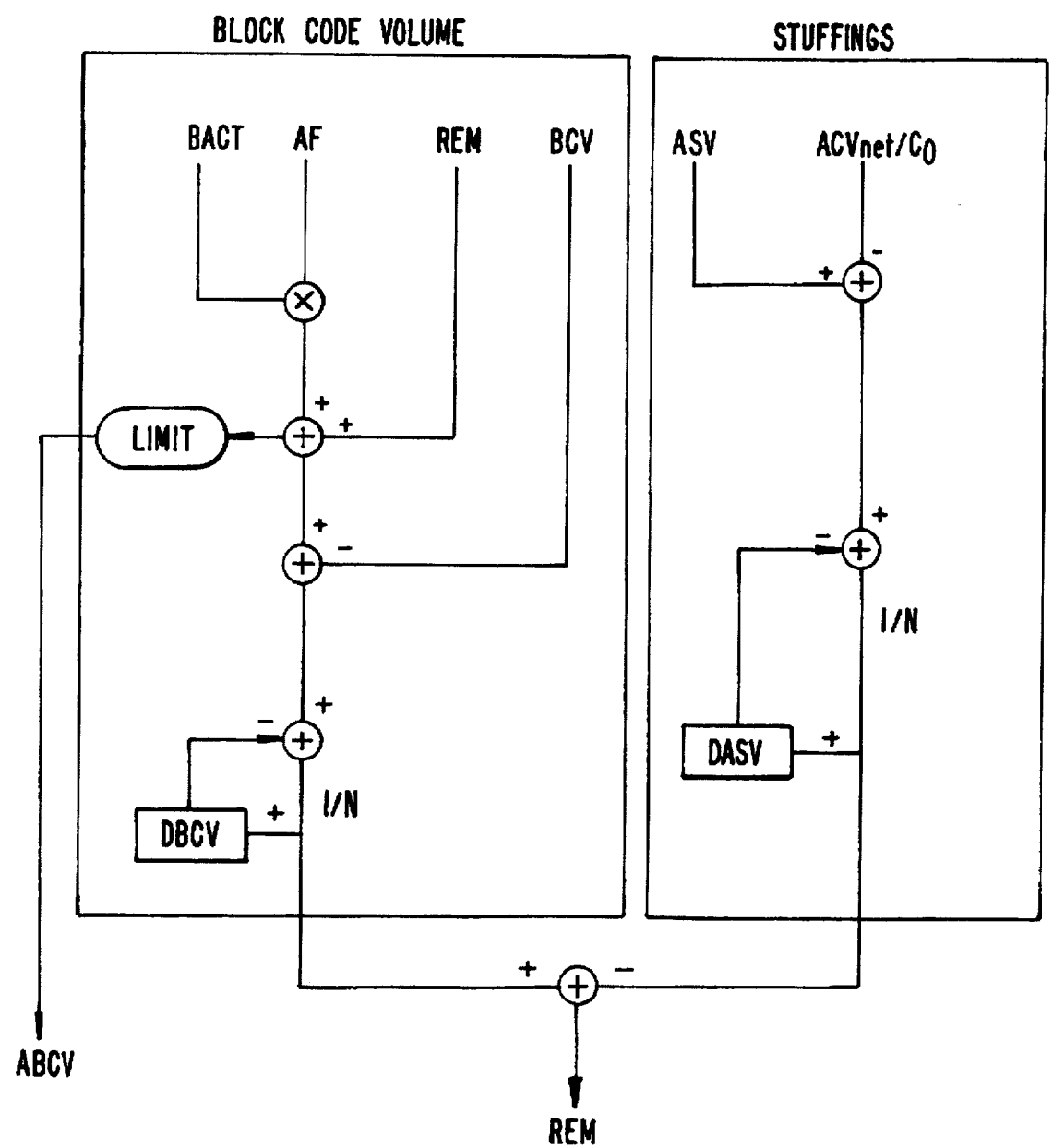
FIG. 5 is a flow diagram of bit allocation in accordance with a preferred embodiment of the invention.

In the compression pass the code volume of the unpredictable features is accumulated and an estimation for it is calculated. After the encoding of each block, the calculated estimation is compared to the accumulated actual code volume. If the estimation was too large, the extra bits are added to the allocation for the compressed image data to improve compression quality. If the estimation was too small, the difference is taken from the next block (or blocks) allocation. The adjustment is done dynamically using the block bit allocation mechanism. FIG. 5 is a block diagram which shows an example for this mechanism.

Some of the coefficients, such as DC coefficients cannot be truncated. After processing the block, the borrowed bits for encoding those coefficients, which are forced not to be truncated when the truncation condition is met, are subtracted from the remainder (REM).

The remainder (REM) is spread between the next several blocks instead of effecting only the next block allocation as in the existing process. This improves the possible unbalanced distribution of allocated bits, as the allocation of each block depends less on the encoding of the previous block. The number of affected blocks can be determined by the user from a given set.

Bit rate control and block allocation in accordance with the invention will now be described with reference to a JPEG implementation.

Overhead is first computed according to the specific way the coder organizes the information in the data stream. This number is a function of the total number of components, the total number of scans, the number of components in each scan, the number of Huffman tables, the number of quantization tables and the length of comment and application segments, if they exist. If restart interval is active then the number of MCU's in each component is also a parameter. Overhead is completely defined in the JPEG standard and known to the coder. TCVnet is given by:

$$TCVnet = TargetSize - Overhead.$$

TCVdata is obtained from TCVnet by subtracting the code volume for the EOB's of all the encoded blocks and an estimation of the bit and byte stuffings. Statistics show that for compression ratios of 1–4 bit per pixel, almost all the EOB's are present in the compressed image. Therefore the volume of the EOB's is a part of the OVERHEAD and not a part of the unpredictable features estimation (ASV). If there are any blocks, that EOB was not encoded for them, then these extra unused bits can still be used for the coding.

The upper bound for the code volume of EOB's is:

$$\sum_{scan=1}^{NumScan} \sum_{comp=1}^{NumComp} NumberOfBlocks(comp) \times EOBcodeLength(comp)$$

Where EOBcodeLength is the length of the Huffman code for EOB in the assigned Huffman table for that component. Scans and Components are defined in the JPEG standard, and NumScan is the number of scans in the frame, and NumComp is the number of components in the scan.

The expected number of bit and byte stuffings can be estimated from gathered statistics of an ensemble of images as a fixed percent from TCVnet.

The new scale factor NSF is computed from the existing scale factor and the ratio between the target and accumulated code volumes of the image data. This is done in the same way as in the ZR36031, as follows:

$$NSF = SF/AF^{1.5}$$

The Allocation Factor (AF) is computed after the statistical pass by:

$$AF = \frac{TCA\ data}{ACT}$$

Where the activity (ACT) was calculated in the statistical pass by:

$$BACT = \Sigma |DCT\ coefficient|$$

$$ACT = \sum_{blocks} BACT$$

This completes the measurement of activity.

The block bit allocation in the compression pass is given by:

$$ABCV = AF \times BACT + REM$$

In the conventional process, a positive REM stands for the remainder allocated bits from the previous block. A negative REM stands for the number of bits, borrowed from the next block, if not enough bits were allocated for encoding DC.

The bit-rate control in accordance with the invention adjusts the estimated stuffing code volume with the actual one, using the allocated block code volume mechanism. This is done in addition to controlling the data code volume of each block. The Accumulated Stuffing Volume (ASV) is compared with its estimation after the encoding of each block. If ASV, is less than the estimated value, these extra bits can be added to ABCV and thus improve compression. On the other hand, if ASV is larger than the estimated value, an overflow may occur, and less bits for the next blocks should be allocated (if ASV is only a little larger than the expected value, it will most likely balance out with the savings of EOB codes).

A further improvement is adjustment being done gradually by letting REM influence a number of blocks, instead of only the next block. This prevents an unbalanced bit allocation for the blocks, which may occur whenever the estimated stuffing volume differs from the actual one. The user can determine the number of blocks which are influenced by REM, designated by N.

The difference between the allocated bits and the actual code size is accumulated through the image—DBCV. It is used for the carry and borrow adjustments. The difference between the estimated and the actual stuffings volume is also accumulated through the image—DASV. It is used for the stuffings adjustments. The remainder influences on the next blocks allocation consists of both DBCV and DASV:

$$REM = \frac{DBCV + DASV}{N}$$

Where N is the number of blocks which are influenced by controlling the code volume of each block.

After a block is coded, DBCV and DASV are updated by subtracting 1/N, which already contributed to the next block allocation:

$$DBCV = DBCV - \frac{DBCV}{N}$$

$$DASV = DASV - \frac{DASV}{N}$$

FIG. 5 is a block diagram of the block allocation scheme. The estimation of the stuffings is ACV net/C0. The limit is necessary for implementation reasons, and the difference to the limited value is also added to the remainder. The limit, N and C0 can be chosen by the user to suit the specific application. The block diagram is only a schematic view of the bit-allocation process. Due to specific implementation timing considerations, some of the variables may be computed at different times and thus effect the computation.

There has been described image compression using an improved bit rate control and block allocation using discrete cosine transforms. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. In an image compression coder for discrete cosine transform (DCT) image signal compression, a method of efficiently storing data using bit rate control and block allocation for discrete cosine transform (DCT) image signal compression, said method comprising the steps of:

(a) partitioning the image signal in blocks representing portions of the total image, (b) calculating DCT coefficients for image data in all blocks, (c) obtaining a measure of block activity (BACT) for each block based on said calculated DCT coefficients and for the total image activity (ACT) as a sum of the measures of all block activity, (d) determining a code allocation factor (AF) for each block based on the ratio of block activity (BACT) to target code volume (TCV data) for the coded image data, (e) allocating bits for each block using the allocation factor (AF) for each block and the target code volume (TCV data), and (f) storing said bits allocated for each block based on said allocation factor and said target code volume, steps (a)-(d) being carried out with a first statistical pass through the image data and step (e) being carried out in a second compression pass through the image data using the code allocation factor (AF) from step (d) and an estimation of unpredictable features for each block.

2. The method as defined by claim 1 wherein step (e) further includes comparing the estimation of unpredictable features to said sum of the measure of all block activity and spreading remainder bits to the allocation for at least the next block allocation and subtracting borrowed bits from at least the next block allocation.

3. The method as defined by claim 2 wherein the subtracting of borrowed bits from at least a next block allocation includes borrowing bits from a plurality of following block allocations.

4. The method as defined by claim 2 wherein step (e) includes spreading any remainder of allocated bits of a block to a following plurality of blocks.

5. The method as defined by claim 3 wherein step (e) includes spreading any remainder of allocated bits of a block to a following plurality of blocks.

6. In an image compression coder for bit rate control and block allocation for discrete cosine transform (DCT) image compression wherein DCT coefficients and an accumulated actual code volume of all block activity are calculated for image blocks in a first pass through all image signals, the steps of:

(a) determining a code allocation factor (AF) for each block based on the ratio of block activity (BACT) to target code volume (TCV data), and (b) allocating bits for each block in a second pass using the allocation factor (AF) and the target code volume (TCV data) and an estimation of unpredictable features for each block, including comparing the estimation of unpredicatable features to the accumulated actual code volume and spreading remainder bits to the allocation for at least the next block allocation and subtracting borrowed bits from at least the next block allocation.

7. The method as defined by claim 6 wherein the subtracting of borrowed bits from at least a next block allocation includes borrowing bits from a plurality of following block allocations.

8. The method as defined by claim 6 wherein the step (b) includes spreading any remainder of allocated bits of a block to a following plurality of blocks.

9. An image compression coder and memory for discrete cosine transform (DCT) image signal compression and storage and having improved bit rate control and block allocation comprising (a) means for partitioning the image signals in blocks representing portions of the total image, (b) means for calculating DCT coefficients for image data in all blocks, (c) means for obtaining a measure of block activity (BACT) for each block based on said calculated DCT coefficients and for the total image activity (ACT) as a sum of the measures of all block activity, (d) means for determining a code allocation factor (AF) for each block based on the ratio of block activity (BACT) to target code volume (TCV data) for the coded image data, (e) means for allocating bits for each block using the allocation factor (AF) for each block and the target code volume (TCV data), and (f) a memory for storing said bits allocated for each block based on said allocation factor for each block and said target code volume, means (a)–(d) operating in a first statistical pass through the image data and means (e) operating in a second compression pass through the image data using the code allocation factor (AF) and an estimation of unpredictable features for each block.

10. The image compression coder as defined by claim 9 and further including means for comparing the estimation of unpredictable features to said sum of the measures of all block activity and spreading remainder bits to the allocation for at least the next block allocation and subtracting borrowed bits from at least the next block allocation.

11. The image compression coder as defined by claim 10 wherein the subtracting of borrowed bits from at least a next block allocation includes borrowing bits from a plurality of following block allocations.

12. The image compression coder as defined by claim 10 wherein the means (e) spreads any remainder of allocated bits of a block to a following plurality of blocks.

13. The image compression coder as defined by claim 11 wherein means (e) spreads any remainder of allocated bits of a block to a following plurality of blocks.

* * * * *